Figure 1:
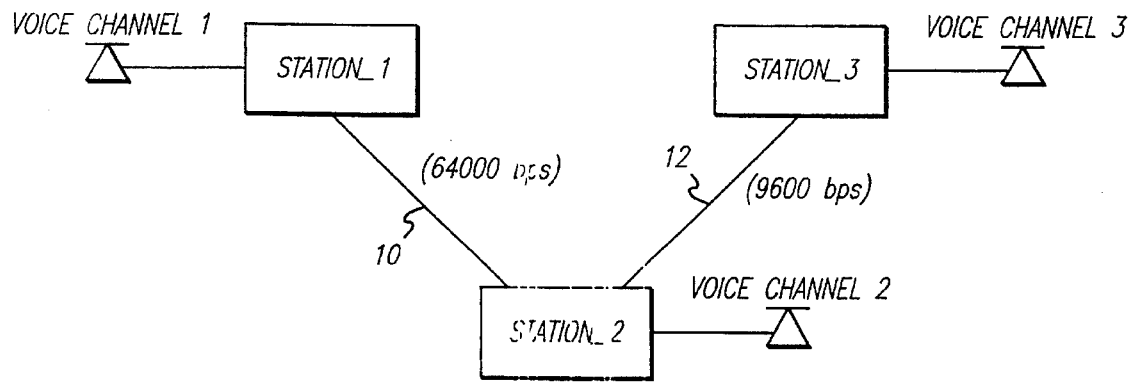

United States Patent [19]
Lam et al.

[11] Patent Number: 5,511,074
[45] Date of Patent: Apr. 23, 1996

[54] VOICE/FAX DIGITIZING RATE NEGOTIATION FOR SWITCHED CONNECTION IN A NETWORK ENVIRONMENT

[75] Inventors: Simon S. Lam, Agoura Hills; Herbert M. Wildfeuer, Simi Valley, both of Calif.

[73] Assignee: Micom Communications Corp., Simi Valley, Calif.

[21] Appl. No.: 209,544

[22] Filed: Mar. 9, 1994

[51] Int. Cl.[6] ................ H04B 1/66; H04J 3/22; H04L 27/00
[52] U.S. Cl. .......... 370/84; 370/94.1; 370/118; 375/377; 375/240
[58] Field of Search ............... 370/79, 84, 94.1, 370/94.2, 94.3, 109, 110.1, 118; 375/122, 121, 240, 377; 348/384, 390; 381/21; 358/426, 430

[56] References Cited

U.S. PATENT DOCUMENTS

| | | | |
|---|---|---|---|
| 4,756,007 | 7/1988 | Quereshi et al. | 370/84 |
| 4,802,189 | 1/1989 | Wedler | 370/84 |
| 5,023,869 | 6/1991 | Grover et al. | 370/118 |
| 5,182,762 | 1/1993 | Shirai et al. | 375/122 |
| 5,243,438 | 9/1993 | Anderton et al. | 370/94.1 |

Primary Examiner—Hassan Kizou
Attorney, Agent, or Firm—Ellsworth R. Roston; Charles H. Schwartz

[57] ABSTRACT

A calling station sends to a called station a call request package including the address of the called station and the information digitizing rate of the calling station. The packet may also include the address of the calling station. The called station selects the lower of the information digitizing rates of the calling and called stations or the information digitizing rates of both stations if such rates are the same. The called station sends to the calling station a call request response package including the selected information digitizing rate. The call request response packet may include the addresses of the calling and called stations. The calling station selects the lower of the information digitizing rates of the calling and called stations or the information digitizing rates of both stations if both rates are the same. The information digitizing rates of the calling and called stations may be the voice digitizing rates of both stations. When the calling station selects the information digitizing rate, the calling and called stations send and receive information packets at such information digitizing rates.

27 Claims, 3 Drawing Sheets

… … …

VOICE/FAX DIGITIZING RATE NEGOTIATION FOR SWITCHED CONNECTION IN A NETWORK ENVIRONMENT

This invention relates to systems for, and methods of, providing for a communication between a calling station and a called station. More particularly, the invention relates to systems for, and methods of, establishing efficient and reliable communications between a calling station and a called station.

Telephone lines are used these days to provide a communication of aural (e.g. voice) and data information between a calling station and a called station. There are significant differences between aural and data communications through telephone lines. For example, data has to be transmitted accurately. If there is an error in the data transmitted, this error can sometimes produce disastrous results, particularly when the data relates to financial matters. However, data does not have to be transmitted in real time. If the telephone lines are loaded, there can be a slight delay in the transmission of data through the telephone lines so that the lines can become cleared. This slight delay will not present a problem to the receiving station provided that the data is transmitted accurately.

In contrast, aural information has to be transmitted on a real time basis. If there is some delay in the transmission of a conversation, a first person at one station may assume that a second person at a second station has stopped talking. The first person may then start to talk while the second person is still talking. This may cause utter confusion in the conversation. Although the conversation has to be in real time, there can be some deterioration in the quality of the voice signals transmitted through the telephone lines. The listener in such conversations is willing to accept some deterioration in the voice quality of the talker as long as he understands the spoken words instantly and recognizes the speaking characteristics of the talker.

To optimize bandwidth utilization, the voice/fax information is compressed or demodulated at the station providing the communication at each instant and decompressed or modulated at the station receiving the communication at that instant. The compression or demodulation at the communicating station and the decompression at the receiving station have to be compatible to each other but they may occur at different rates. For example, the sending station may be sending voice/fax signals through the network at a rate of 9600 bauds per second. To be compatible, the receiving station has to operate at 9600 bauds per second so that the compression resulting from the sending of the voice/fax signals at 9600 bits per second may be compatible with the decompression of the signals at the receiving station. In another example, when the voice or fax signals are compressed/demodulated and transmitted at 16,000 bits per second, the signals have to be received and decompressed or modulated at 16,000 bits per second.

The interconnecting links (e.g. telephone lines) between different pairs of stations may have different limitations in the rate at which voice/fax signals can be sent and received. For example, the link between stations 1 and 3 may allow voice signals to be sent in compressed form and to be received and decompressed at a rate of 16,000 bits per second. However, the interconnecting link between stations 1 and 2 allows voice signals to be sent in compressed form and to be received and decompressed only at a rate of 9600 bits per second.

It will be appreciated that it is desirable to send and receive voice signals between a pair of stations at the highest rate which the interconnecting link will allow. In this way, the interconnecting lines are available for the transmission and reception of other information. Under such circumstances, it is desirable to transmit the signals at the highest rate which is compatible to both the sending and receiving stations.

When a calling station initiates a call to a called station, it does not know what the transmission rate limitations are of the interconnecting link. Furthermore, the systems now in use do not provide any way of determining what these bit rate limitations are. Because of this, the communication between the calling station and the called station has often been at a transmission digitizing rate below the optimum transmission frequency rate which can be provided between the calling station and the called station. This has been recognized as a problem for some time. However, no one has as yet provided an adequate resolution of this problem.

In one embodiment of the invention, a calling station sends to a called station a call request package including the address of the called station and the information digitizing rate of the calling station. The packet may also include the address of the calling station. The called station selects the lower of the information digitizing rates of the calling and called stations or the information digitizing rates of both stations if such rates are the same.

The called station sends to the calling station a call request response package including the selected information digitizing rate. The call request response packet may include the addresses of the calling and called stations. The calling station selects the lower of the information digitizing rates of the calling and called stations or the information digitizing rates of both stations if both rates are the same.

The information digitizing rates of the calling and called stations may be the voice digitizing rates of both stations. When the calling station selects the information digitizing rate, the calling and called stations send and receive information packets at such information digitizing rates.

Figure 4:
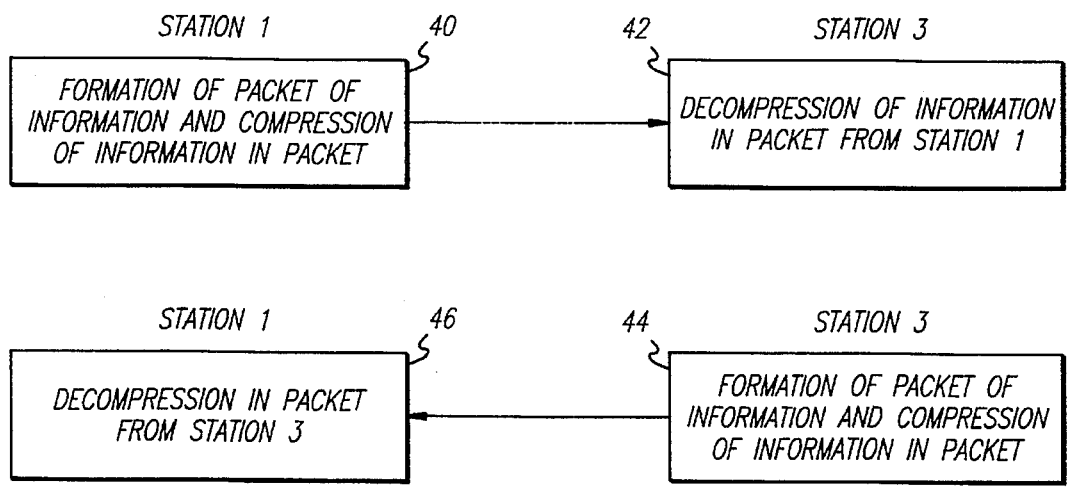
Figure 2:
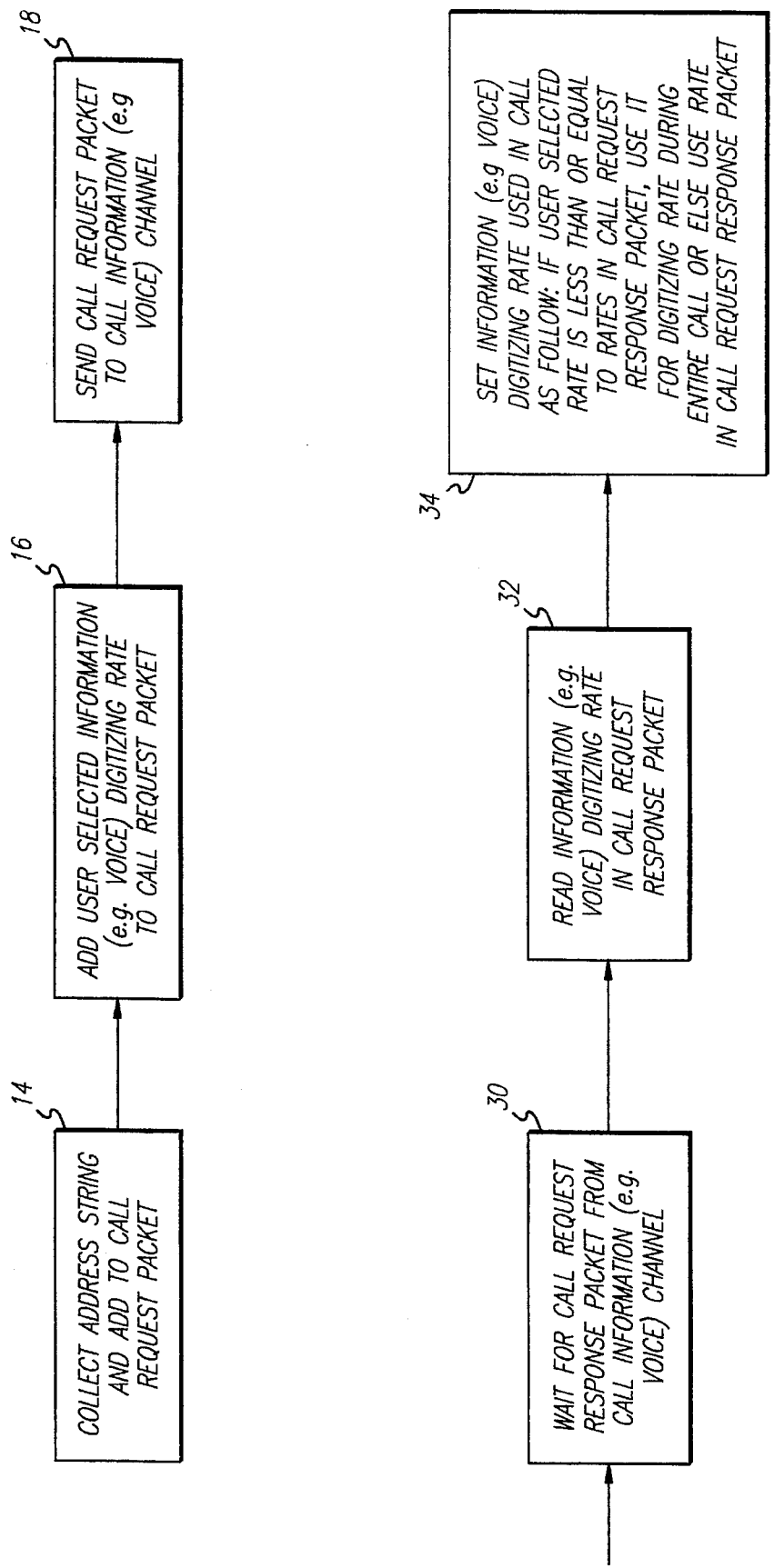
Figure 3:
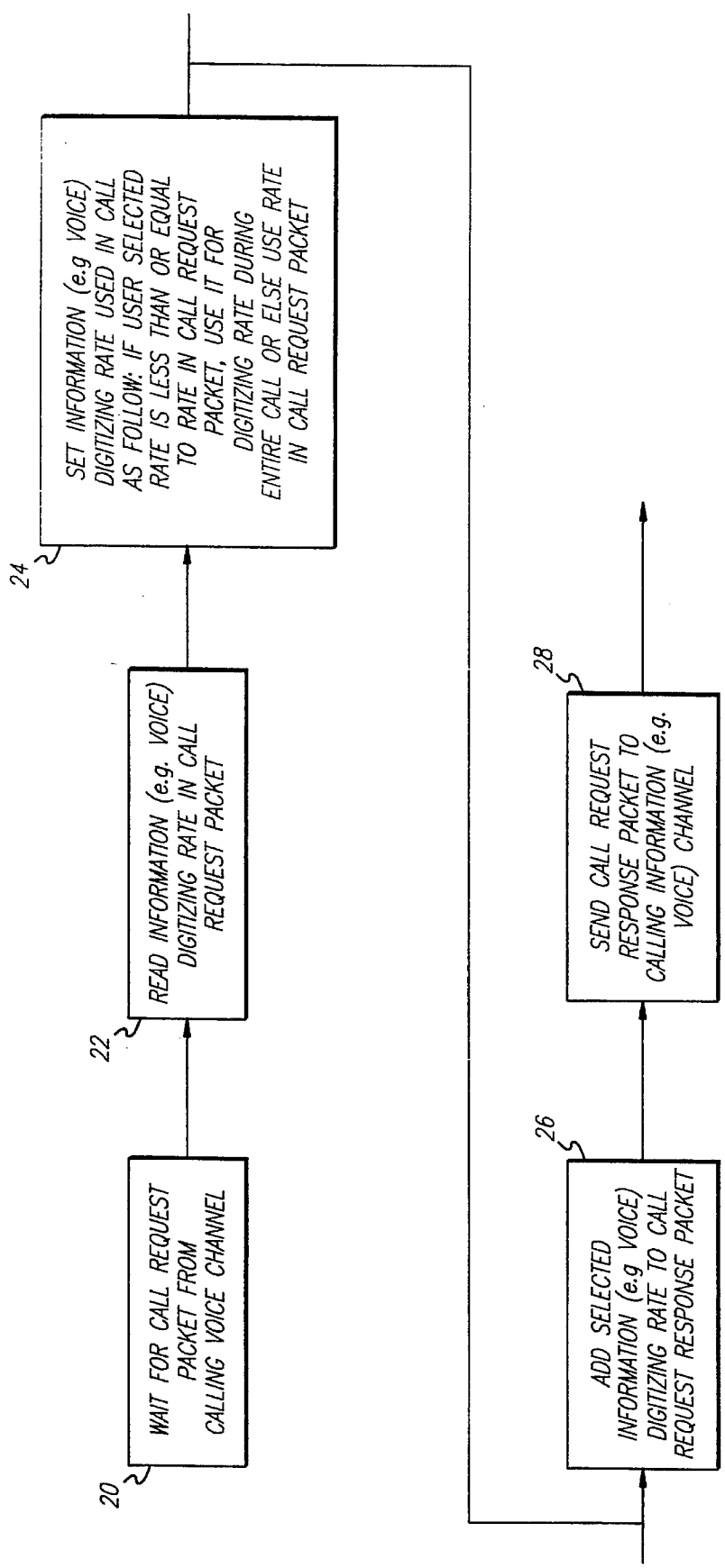

In the drawings:

FIG. 1 indicates three (3) stations or nodes and indicates interconnecting links between stations 1 and 2 and between stations 2 and 3 and the transmission rate limitations of these interconnecting links;

FIG. 2 is a schematic view illustrating the operation of station 1 in instituting a call to station 3;

FIG. 3 is a schematic view illustrating the operation of station 3 when station 1 institutes a call to station 3; and FIG. 4 is a schematic view illustrating the operations of stations 1 and 3 after station 1 has instituted the call to station 3.

In one embodiment of the invention, three stations or nodes are schematically designated as station 1, station 2 and station 3 in FIG. 1. An interconnecting link 10 is shown between stations 1 and 2. This interconnecting link has a maximum transmission rate of 64,000 bits per second for transmitting information (e.g. voice) between stations 1 and 2. When the transmission rate is at a rate of 64,000 bits per second, some compression of information at a higher rate can be provided at the sending station and a corresponding decompression of information is provided at the receiving station.

An interconnecting link 12 is shown between the stations 2 and 3 in FIG. 1. The maximum transmission rate through the interconnecting link 12 is shown in FIG. 1 as being 9600 bits per second. Since the information is transmitted at a relatively low rate in comparison to 64,000 bits per second, a greater compression has to be provided in the transmission at 9600 bits per second than at 64,000 bits per second. The compression of information at the sending station has to be matched by the decompression of information at the receiving station.

Assume now that station 1 wishes to call station 3. FIGS. 2 and 3 schematically illustrate the operation of the system and method of the invention under such circumstances. The operation of the station 1 during the initiation of the call is schematically shown in FIG. 2 and the operation of the station 3 under such circumstances is schematically shown in FIG. 3.

When station 1 wishes to initiate a call to station 3, it provides a call request packet as indicated at 14 in FIG. 2. The call request packet includes the address of station 3 and may include the address of station 1. Station 1 then adds the user selected information digitizing rate (e.g. voice) of station 1 to the packet. This is indicated at 16 in FIG. 2. Station 1 then sends the packet to station 3 as indicated at 18 in FIG. 2.

FIG. 3 illustrates the operation of station 3. As indicated at 20 in FIG. 3, station 3 waits for the call request packet from station 1. When it receives the call request packet, station 3 reads the user selected information digitizing rate of station 1 in the call request packet. This is indicated at 22 in FIG. 1. Station 3 then selects an information digitizing rate as indicated at 24 in FIG. 3. Station 3 selects this information digitizing rate by determining the lower of the information digitizing rates of stations 1 and 3 or by determining the rates of both stations if such rates are the same. Specifically, station 3 may select its information digitizing rate if its rate is less than or equal to the information digitizing rate of station 1. Otherwise, station 3 selects the information (e.g. voice) digitizing rate of station 1.

Station 3 then provides a call request response packet as indicated at 26 in FIG. 3. This call request response packet includes the selected (as described in previous paragraph) information (e.g. voice) digitizing rate of station 3. It may also include the addresses of stations 1 and 3. Station 3 then sends the call request response packet to station 1 as indicated at 28 in FIG. 3.

Station 1 waits for the call request response packet from station 3. This is indicated at 30 in FIG. 2. When it receives the call request response packet, station 1 reads the selected information (e.g. voice) digitizing rate of station 3 in the call request response packet, as indicated at 32 in FIG. 2. Station 1 then selects its information digitizing rate if its information digitizing rate is less than or equal to that of station 3. Otherwise, it selects the information digitizing rate of station 3.

Station 1 then initiates a communication with station 3. FIG. 4 schematically illustrates the transmission and reception of information between stations 1 and 3 after the digitizing rate for the information transmitted between such stations has been established by such stations. The system shown in FIG. 4 is well known in the art. For example, when station 1 is sending information (e.g. voice) to station 3, the information is in the form of packets. The information in each packet is compressed or demodulated. The amount of information compression or demodulation in each packet is dependent upon the selected information digitizing rate. For example, the compression does not have to be as great for a transmission rate at 64,000 bits per second than for a transmission rate at 9.6 bits per second. The information received at station 3 is decompressed or modulated to restore the information to the state in which it existed at station 1 before compression or modulation. This decompression at station 3 corresponds to the compression at station 1.

FIG. 4 illustrates at 40 the compression of information at station 1 and at 42 the decompression of information at station 3 when station 1 transmits information (e.g. voice) to station 3. Similarly, FIG. 4 illustrates at 44 the compression of information at station 3 and the decompression of information at station 1 when station 3 transmits information (e.g. voice) to station 1.

Although this invention has been disclosed and illustrated with reference to particular embodiments, the principles involved are susceptible for use in numerous other embodiments which will be apparent to persons skilled in the art. The invention is, therefore, to be limited only as indicated by the scope of the appended claims.

We claim:

1. A method of providing for calls between a calling station and a called station, including the steps of:

sending a call request packet from the calling station to the called station, the call request packet including the address of the called station and an information digitizing rate of the calling station, determining at the called station if an information digitizing rate of the called station is less than or equal to the information digitizing rate of the calling station and, if so, selecting the information digitizing rate of the called station and, if not, selecting the information digitizing rate of the calling station, sending to the calling station the information digitizing rate selected by the called station, thereafter determining at the calling station if the information digitizing rate of the calling station is less than or equal to the information digitizing rate selected by the called station and, if so, selecting the information digitizing rate of the calling station and, if not, selecting the information digitizing rate selected by the called station, and compressing information sent by the calling station to the called station by an amount dependent upon the information digitizing rate selected by the calling station after the receipt by the calling station of the information digitizing rate selected by the called station.

2. A method as set forth in claim 1 wherein the calling station sends voice information to the called station after the calling station receives the information digitizing rate selected by the called station and selects the information digitizing rate of the calling station in accordance with the information digitizing rate selected by the called station and wherein the calling station selects an amount of compression for such voice information dependent upon the information digitizing rate selected by the calling station.

3. A method as set forth in claim 1 wherein the called station provides a call request response packet including the information digitizing rate selected by the called station and sends the call request response to the calling station, the calling station determines from the call request response packet the information digitizing rate selected by the called station, and the called station decompresses the compressed information received by the called station from the calling station, the decompression being by an amount dependent upon the information digitizing rate selected by the calling station.

4. A method as set forth in claim 3 wherein the calling station includes the addresses of the called and calling station in the call request packet sent by the calling station to the called station, and wherein the called station includes the addresses of the called and calling stations in the call request response packet sent by the called station to the calling station.

5. A method as set forth in claim 4 wherein the information transmitted after the call request response packet is voice/fax information and wherein the called station decompresses the voice information from the calling station by an amount dependent upon the information digitizing rate selected by the calling station.

6. A method as set forth in claim 3 wherein the amount of the compression of the information sent by the calling station to the called station is inversely related to the information digitizing rate selected by the calling station and wherein the amount of the decompression of the information receiving by the called station from the calling station is inversely related to the information digitizing rate selected by the calling station.

7. A method of providing for calls from a calling station to a called station, including the steps of:

providing at the calling station a call request packet including the address of the called station and an information digitizing rate of the calling station, sending the call request packet from the calling station to the called station, receiving at the called station from the calling station the call request packet provided at the calling station including the information digitizing rate of the calling station, and adopting at the called station the information digitizing rate of the calling station if such information digitizing rate is less than or equal to an information digitizing rate of the called station and otherwise adopting the information digitizing rate of the called station, transmitting from the called station to the calling station the information digitizing rate adopted by the called station, selecting at the calling station the information digitizing rate of the calling station when the calling station determines that its information rate is less than or equal to the information digitizing rate adopted by the called station, and providing for a compression of the information sent from the calling station to the called station, after the selection of the information digitizing rate by the calling station, by an amount dependent upon the information digitizing rate selected by the calling station.

8. A method as set forth in claim 7, including the steps of:

the information digitizing rate in the call request packet constituting a digitizing rate for voice information, sending a call request response packet from the called station to the calling station to indicate the information digitizing rate selected by the called station.

9. A method as set forth in claim 7 wherein the called station sends a called request response packet to the calling station to indicate the information digitizing rate selected by the called station and wherein the calling station waits for the call request response packet from the called station after sending the call request packet to the called station and wherein the calling station receives the information digitizing rate selected by the called station in the call request response packet sent by the called station and wherein the calling station provides for the compression of the information sent by the calling station to the called station after the calling station receives the information digitizing rate selected by the called station, the amount of compression of such information provided by the calling station being dependent upon the information digitizing rate selected by the calling station.

10. A method as set forth in claim 9 wherein the calling station includes the address of the calling station in the call request packet and wherein the called station includes the addresses of the called station and the calling station in the call request response packet sent by the called station to the calling station and wherein the called station decompresses the information sent by the calling station in accordance with the information digitizing rate selected by the calling station.

11. A method as set forth in claim 7 wherein the calling station sends packets of information to the calling station at the digitizing rate selected by the calling station after receiving the call request response packet from the called station, the information in the packets being compressed by an amount dependent upon such information digitizing rate and wherein the called station decompresses the information sent by the calling station by an amount dependent upon the information digitizing rate selected by the calling station.

12. A method as set forth in claim 11 wherein the information digitizing rate of the calling station constitutes a digitizing rate for voice information.

13. A method at a called station of receiving calls from a calling station, including the steps of:

receiving from the calling station a call request packet including the address of the called station and an information digitizing rate of the calling station, determining the information digitizing rate of the calling station, selecting the information digitizing rate of the called station if the information digitizing rate of the called station is less than or equal to the information digitizing rate of the calling station and otherwise selecting the information digitizing rate of the calling station, sending to the calling station in a call request response packet the information digitizing rate selected by the called station, receiving, at the information digitizing rate thereafter selected by the calling station when the calling station determines that the information digitizing rate of the calling station is less than or equal to the information digitizing rate selected by the called station, the information sent by the calling station to the called station, and decompressing the information sent by the calling station to the called station by an amount dependent upon the information digitizing rate selected by the calling station.

14. A method as set forth in claim 13 wherein the information digitizing rate selected by the called station is a digitizing rate for voice information.

15. A method as set forth in claim 13 wherein the information received by the called station from the calling station is in packets at the information digitizing rate selected by the calling station.

16. A method as set forth in claim 15 wherein the call request packet received by the called station from the calling station includes addresses of the calling and called stations and the call request response packet sent by the called station to the calling station includes the addresses of the calling and called stations.

17. A method as set forth in claim 13 wherein the amount of the decompression provided by the called station on the information received from the calling station is inversely related to the information digitizing rate selected by the calling station.

18. A method at a called station of receiving calls from a calling station, including the steps of:

receiving from the calling station a call request packet including the addresses of the called station and the calling station and an information digitizing rate of the calling station, selecting an information digitizing rate of the called station if the information digitizing rate of the called station is less than or equal to the information digitizing rate of the calling station and otherwise selecting the information digitizing rate of the calling station, sending to the calling station in a call request response packet the information digitizing rate selected by the called station, thereafter receiving information from the calling station at the information digitizing rate selected by the calling station when the calling station determines that the information digitizing rate of the calling station is less than or equal to the information digitizing rate selected by the called station, and decompressing the received information by an amount dependent upon the information digitizing rate selected by the calling station.

19. A method as set forth in claim 18, wherein the information received by the called station from the calling station is in packets at the information digitizing rate selected by the calling station.

20. A method as set forth in claim 19 wherein the information digitizing rate received by the called station in the call request packet is for voice information.

21. A method as set forth in claim 20 wherein the call request packet received by the called station includes the addresses of the calling and called stations and wherein the called station includes the addresses of the calling and called stations in the call request response packet sent by the called station to the calling station.

22. A method as set forth in claim 18 wherein the amount of the decompression provided by the called station in the information received from the calling station is inversely related to the information digitizing rate selected by the calling station.

23. A method as set forth in claim 18 wherein the amount of compression of the information sent from the calling station to the called station is inversely related to the information digitizing rate selected by the calling station.

24. A method at a calling station of providing calls to a called station, including the steps of:

providing a call request packet including the addresses of the calling station and the called station and an information digitizing rate of the calling station, sending the call request packet to the called station, receiving from the called station a call request response packet including the addresses of the calling station and the called station and an information digitizing rate adopted by the called station, selecting at the calling station the information digitizing rate of the calling station if this information digitizing rate is less than or equal to the information digitizing rate adopted by the called station and otherwise selecting the information digitizing rate adopted by the called station, and sending packets of information from the calling station to the called station at the information digitizing rate selected by the calling station, the information in the packets having an amount of compression dependent upon the information digitizing rate selected by the calling station.

25. A method as set forth in claim 24 wherein the information digitizing rates of the calling and called stations are the respective digitizing rates of such stations for voice information.

26. A method as set forth in claim 24 wherein the calling station sends and receives information packets at the information digitizing rate selected by the calling station.

27. A method as set forth in claim 24 wherein the amount of the compression provided by the calling station in the information sent by the calling station to the called station at the information digitizing rate selected by the calling station is inversely related to such information digitizing rate.

* * * * *